April 19, 1932.   R. B. NOBLE   1,854,758
WINDSHIELD CLEANER
Filed Jan. 7, 1930
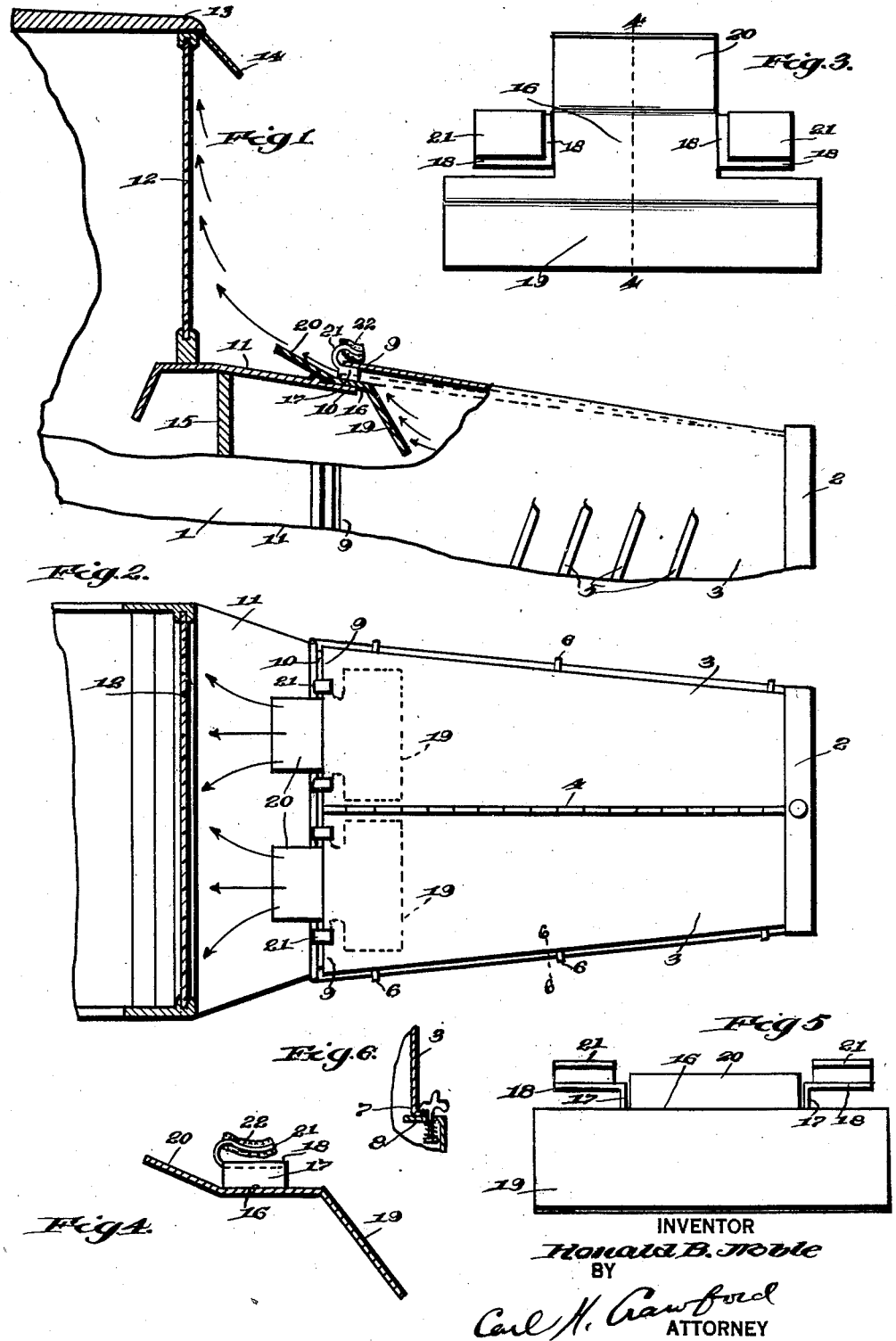
INVENTOR
Ronald B. Noble
BY
Carl N. Crawford
ATTORNEY Patented Apr. 19, 1932

1,854,758

UNITED STATES PATENT OFFICE

RONALD B. NOBLE, OF SPOKANE, WASHINGTON

WINDSHIELD CLEANER

Application filed January 7, 1930. Serial No. 419,038.

The object of this invention is to provide an improved means for maintaining the windshield of an automobile transparent during rainy or snowy weather.

The device of this invention utilizes the hot air from under the hood of the automobile for melting snow, sleet or the like and drying off rain from the windshield.

It is one of the objects of the invention to provide a device for this purpose capable of causing the widest possible spread of application of the hot air against the windshield and also reducing the friction of conveying such air, to a position of application to the windshield, thereby reducing loss of velocity to a minimum.

It is a feature of this invention to provide a device that is essentially a hood prop, and which forms in connection with a hood or cowl portion a conveying passage for discharge of hot air from beneath the hood directly against the windshield.

A further feature consists in making the device coact interdependently with the means for anchoring the hood wings so that when the latter are anchored, the device of this invention will be securely held in place.

The device of this invention is provided with means adapted to grip the hood, or a wing thereof, in a detachable manner so that no physical alteration need be made in the installation of the device, and whereby the hood wing may readily be raised or lowered without dislodging or requiring detachment of the device therefrom, and hence the device is clearly an accessory as distinguished from a built in feature.

The invention has many other features and objects which will be more fully described in connection with the accompanying drawings and which will be more particularly pointed out in and by the appended claims.

In the drawings:—

Fig. 1 is a view in side elevation, partly in section, of the front portion of an automobile showing one application of the device of the invention thereto.

Fig. 2 is a plan view thereof, partly in section.

Fig. 3 is a top plan view of the prop detached from the automobile and being shown on an enlarged scale.

Fig. 4 is a sectional view on line 4—4 of Fig. 3.

Fig. 5 is a view in elevation looking from the right of Fig. 4.

Fig. 6 is a detail section taken on line 6—6 of Fig. 2.

Like characters of reference designate similar parts throughout the different figures of the drawings.

In the accompanying drawings, the body of an automobile is generally indicated at 1, the same having a radiator 2 and a hood consisting of the usual wing sections 3, hingedly connected at 4. The wings have the usual vent slots 5, and spring controlled fasteners 6, of the usual type, hold the lower edges 7, of the hood wings 3, down against or in close adjacency to the frame 8. The rear edges 9, of the hood wings 3, are adapted to seat on the forward edge 10, of the cowl 11, from which the windshield 12, rises to the top 13. A visor 14 overhangs the windshield in the usual way. A cowl partition 15 separates the interior of the body 1, from the engine space beneath the hood.

I will now refer to what more specifically constitutes the invention, as an article of manufacture, and which in many ways, interdependently coacts with the subject matter just described.

My invention essentially consists of a prop passage forming device for the discharge of hot air from beneath the hood against the windshield to maintain the latter transparent by constantly removing ice, snow, sleet and rain therefrom. As shown more particularly in Figs. 3, 4 and 5, of the drawings the device is stamped or formed from an integral sheet of material, preferably metal, and does not contain any pivotally connected or other separate movable parts. What I will term an elongated and narrow base, is indicated at 16, and it is the function of this base to coact with portions of the hood or cowl, and in the drawings, this coactive relation is shown in connection with the latter. Thus, in Fig. 1, I have shown the base 16 seated on the forwardly projecting flange 10, of the cowl. As shown in Fig. 2, the device or devices where two are used, are disposed near the hinge 4, of the hood wings 3, as at this location, the cowl is substantially flat, with little or no curvature.

However, the sheet material of which the device is formed, will readily yield to pressure such as will curve the base to the contour of the part against which it abuts. As shown more particularly in Fig. 1, that portion on which the base 16 is seated, is the cowl portion which, specifically speaking is the flange 10, thereof. Near the ends of the base 16, the stock of the base is bent upwardly as shown at 17, to form supporting risers 18, to support one portion, which as shown, is the hood portion, in separated relation to the cowl portion. Thus, the rear edge 9, of one of the hood wings 3, is mounted on the risers 18 and supported thereby in spaced relation to the cowl 10.

There is thus formed, a passage, the bottom of which is the base 16, the ends, the riser portions 17, and the top, the hood wing 3, through which passage hot air is free to discharge rearwardly and upwardly against the windshield 12, as shown by the arrows in Fig. 1. The hot air trapped in the top of the hood forwardly of partition 15, which often blisters the rear of the hood and the cowl, naturally seeks egress through the opening thus formed and the forward motion of the car causes rearward movement of this discharging hot air against the windshield.

It is of particular importance to note that the passage formed, is very greatly exceeded in width with respect to its length, and hence it cannot be termed a pipe or conduit as the friction generated in the movement of the air therethrough, is clearly reduced to a minimum, and hence, I retain most of the velocity.

In order more effectively to collect the air and guide it toward the prop passage just described, I provide the device with what I will term a collecting deflector 19, which extends downwardly as shown in Fig. 1, and which deflects the hot air upwardly toward the prop passage in greater volume than is possible in the absence of this deflector. The arrows of Fig. 1, illustrate this function. It is also a feature to extend the deflector 19 laterally of the prop passage, as will be seen by reference to Figs. 2 and 3, to increase the capacity of the deflector.

In actual practice, the hood wing or wings are only elevated from one quarter to three eighths of an inch above the cowl flange 10, and while portions of the hood wing laterally adjacent the ends of the device will be slightly lifted, this will in no way impair the efficiency of the device as an ample flow of hot air is available. In fact, when a hood is closed, most of the hot air travels rearwardly and escapes beneath the floor board of the car, as the vents, indicated at 5, in the hood wings 3, only accommodate a moiety of the hot air that is discharged. Therefore, such leakage as occurs laterally of my device, is discharged rearwardly toward the windshield although it is less effective because of its reduced volume than the air that passes through my device.

It is a feature to provide the device with a discharge deflector which I have shown at 20, which is subjected to and which gently deflects the discharging hot air upwardly over the cowl and against the windshield, as shown by the arrows in Fig. 1. As the air seeks to ascend, and as forward movement of the car carries the air rearwardly, the hot air is spread over a very wide area of the windshield in a continuous and effective stream of sheet-like form.

This sheet-like form of air stream is also due to the laterally elongated and narrow form of the passage as shaped by the prop device.

It is a feature of this invention to provide a device of this character which can readily be inserted into a position of service without requiring any physical alteration of the car. In this connection, reliance is primarily placed upon car equipment to hold said device in place.

I have illustrated in Fig. 6, the well known fasteners 6, heretofore described, which are spring actuated. When the prop or props are inserted under the hood wings, as shown in Figs. 1 and 2, the lower ends of the hood wings are held down by fasteners 6, and this securely holds the devices in place. It also serves to bend the hood wings 3 down closely against the cowl edge 10, laterally of the props as the wings readily yield for this purpose.

However, it is a feature of this invention to connect the improved prop device to the car in such a manner that the hood wings may easily be lifted and then returned to a closed position without causing the prop devices to be dislodged, or to necessitate their replacement back into an operative position.

In the present construction, I prefer to connect said prop devices to the hood wings 3. Thus, the risers 18, are provided with integral clips 21, which are adapted to extend over the end and forwardly over the top of the rear end edge of the hood wing, as clearly shown in Fig. 1. These clips are sufficiently closely spaced or are adequately resilient to firmly hold the edge of the hood down against the risers 18. Thus, when a hood wing 3, is disconnected and elevated, the prop will be raised therewith, and when the wing is lowered, the prop will take its position on the cowl.

To prevent marring the finish on the upper face of the hood wing 3, I preferably equip the clips 21, with suitable sleeves 22, of fabric or the like, as shown in Figs. 1 and 4.

It will now be clear from Fig. 1, that I take the hot air from the hood above the vents 5, and in the most favorable position to obtain the greatest velocity and volume.

While I have shown one specific form of the invention I do not wish to be limited thereto except for such limitations as the claims may import.

I claim:—

1. In a means for maintaining an automobile windshield transparent against moisture, a prop device having an elongated base adapted to seat on the front edge of the cowl, said base having hood supporting risers near its ends for supporting the rear edge of the hood in spaced relation to the cowl and forming with said hood and base a sheet-like passage for discharging hot air from under the hood rearwardly against the windshield, and said risers having spring clips extending over the top rear edge of the hood and holding the latter against said risers to removably secure said prop device to said hood.

2. In an accessory means for maintaining an automobile windshield transparent against moisture, a prop device adapted to be interposed between hood and cowl portions of an automobile and having an elongated narrow base adapted to seat on the cowl portion, said base having hood supporting risers near its ends or supporting the rear edge of the hood portion in spaced relation to the cowl portion and forming with said hood portion a sheet-like passage having a width greatly exceeding its length for discharge of hot air against the windshield, said risers having frictionally acting spring clips extending over and above the rear edge of the hood portion to frictionally hold the latter against said risers and removably connect said prop device with said hood, and said base having a hot air collecting deflector extending under the hood portion for guiding hot air toward said passage, and said base having an upwardly inclined discharge deflector extending over said cowl and subjacent the hot air for guiding discharging hot air against said windshield.

In witness whereof I have hereunto set my hand.

RONALD B. NOBLE.